Figure 1:
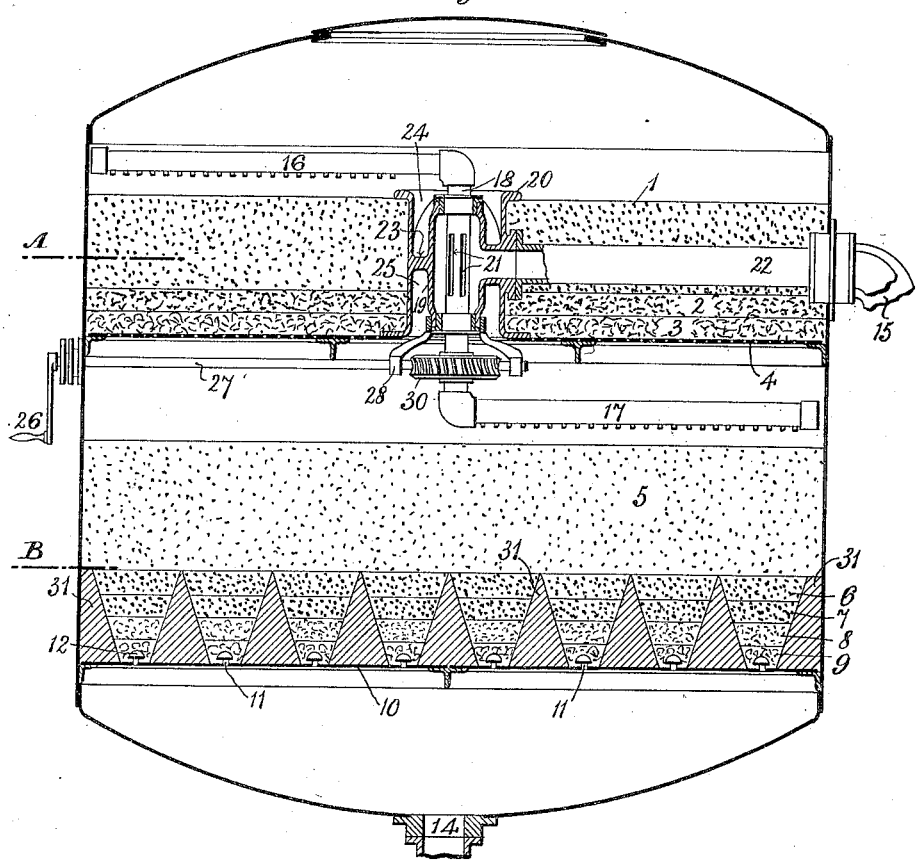

F. & F. P. CANDY.
FILTER.
APPLICATION FILED MAY 4, 1912.

1,057,328.

Patented Mar. 25, 1913.

4 SHEETS—SHEET 1.

Witnesses:

Inventors
Frank Candy
Frank P. Candy

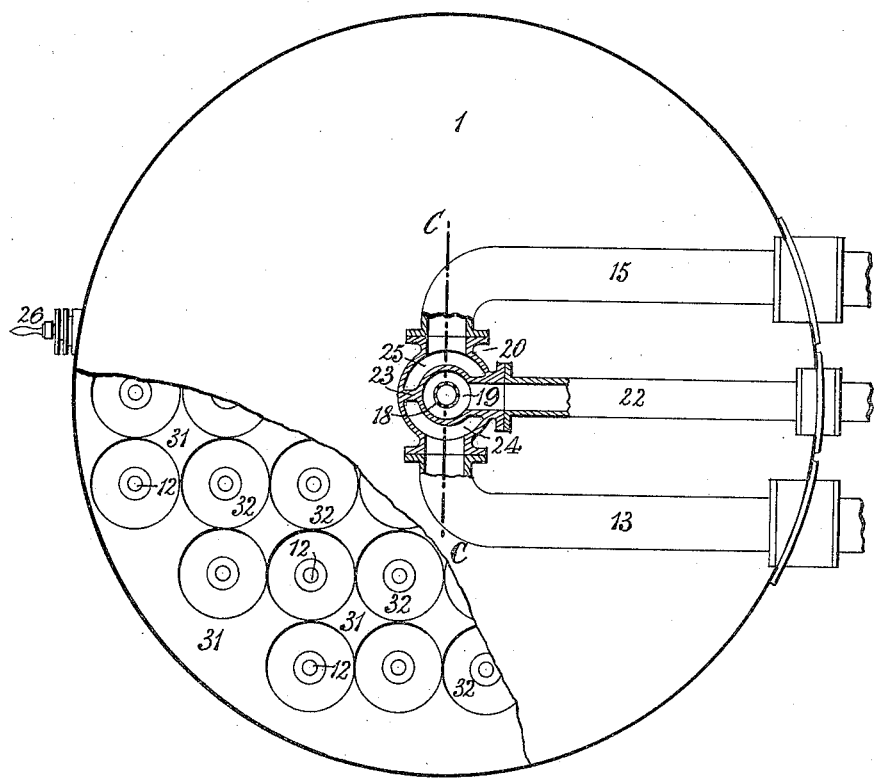

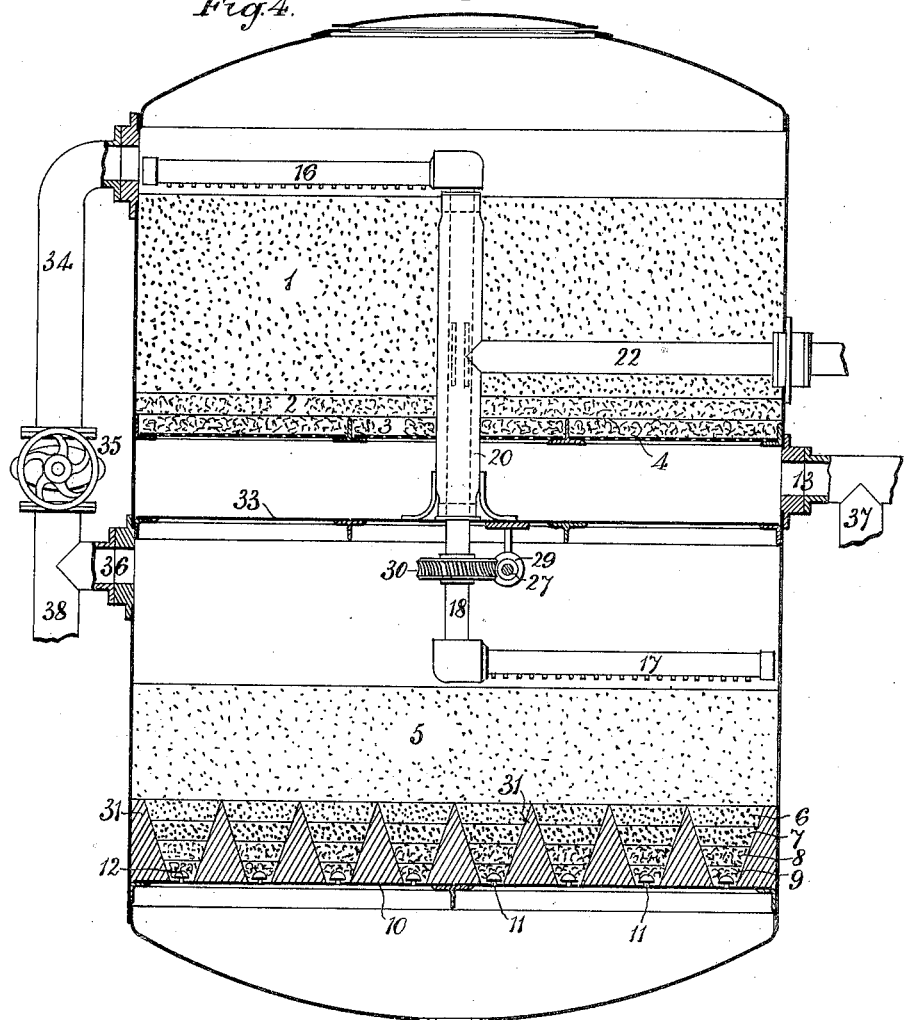

F. & F. P. CANDY.
FILTER.
APPLICATION FILED MAY 4, 1912.
1,057,328.
Patented Mar. 25, 1913.
4 SHEETS—SHEET 4.
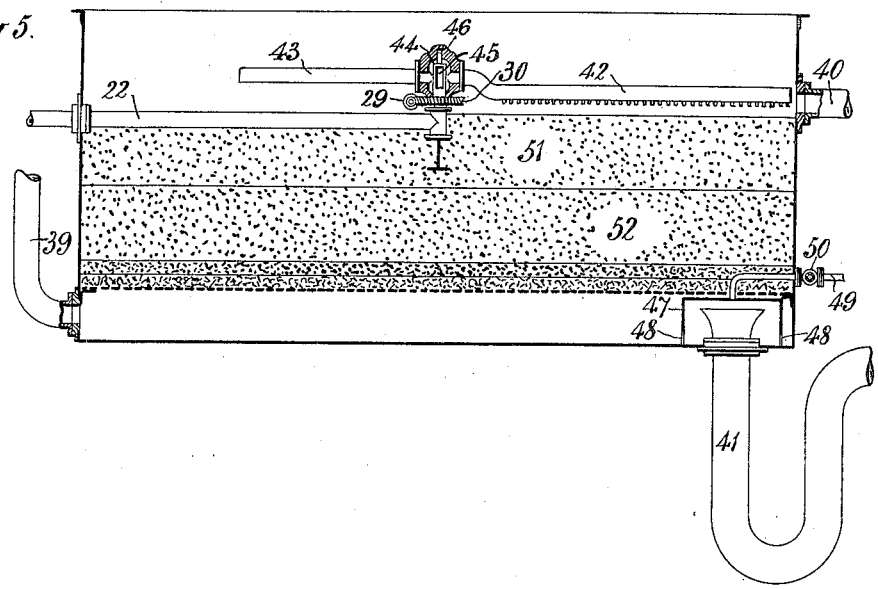
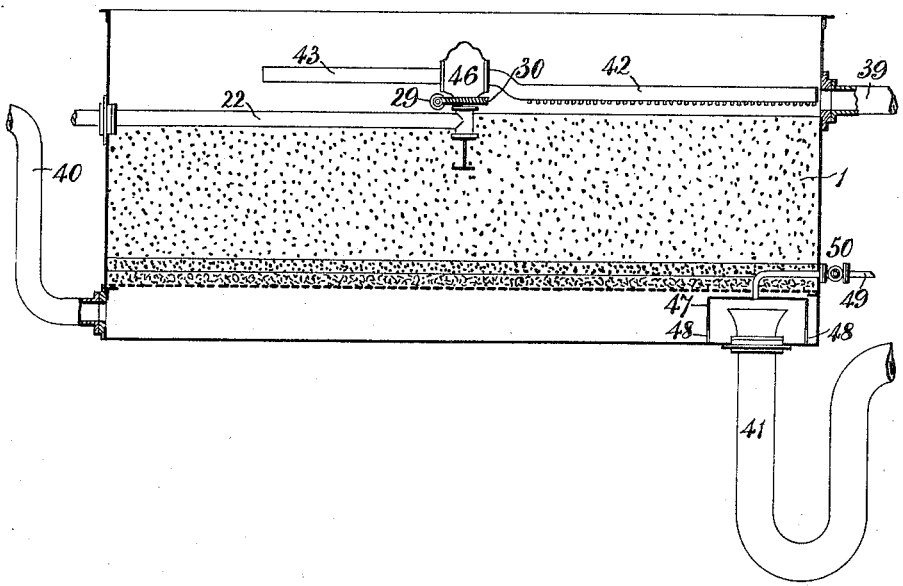
Witnesses:
Inventors
Frank Candy
Frank P. Candy

UNITED STATES PATENT OFFICE.

FRANK CANDY AND FRANK PULLEN CANDY, OF WESTMINSTER, LONDON, ENGLAND.

FILTER.

1,057,328.   Specification of Letters Patent.   Patented Mar. 25, 1913.

Application filed May 4, 1912.   Serial No. 695,146.

*To all whom it may concern:*

Be it known that we, FRANK CANDY and FRANK PULLEN CANDY, both subjects of the King of Great Britain, residing at No. 5 Westminster Palace Gardens, Westminster, London, England, have invented new and useful Improvements in or in Connection with Filters, of which the following is a specification.

The said invention relates to means or provisions for use in cleaning or aiding the cleaning of beds or layers of coarse filtering material in filters suitable for working waterlogged, the object of the said invention being to economize the water used in the washing operation and to increase its efficiency as compared with that used with known provisions for the said purpose.

According to the said invention as applied to a filter having two layers or beds mainly of fine and coarse filtering material respectively the beds are arranged with a space between them and the provisions for causing cleansing or washing water to pass through the beds are such that cleansing water passes downwardly through the bed of coarse material and upwardly through the bed of fine material whether filtration is provided for in a downward direction through both beds or upwardly through the bed of coarse material and downwardly through the bed of fine material. Above the coarse bed a perforated rotatable or traveling water conduit is mounted from which sprays of washing water are discharged upon the said bed, and the flushing and cleaning action of the wash water in the fine bed is preferably supplemented by a similar conduit mounted above it for downward discharge of jets of water. In order to insure that the upward flow of wash water through the bed of fine material shall be even the openings in the floor supporting it for passage of filtered water from the bed and wash water to the bed are preferably each surrounded by the wall of an open topped chamber or pit of inverted conical or pyramidal or other shape containing coarse filtering material directly supporting the fine filtering material.

When the said invention is applied to a filter having one layer or bed only of coarse filtering material and no bed of fine filtering material provision is made for downward flow of wash water therethrough whether the direction of filtration through the bed be upward or downward and a perforated rotatable or traveling water conduit is mounted over the said bed for discharge of sprays of water upon the bed during the washing process. In order to provide for rapid passage of wash water through the bed a flush or wash out valve or its equivalent which may be quickly opened is provided at the bottom of the filter and in comparatively large filters this is preferably provided by means of an air lock controlling passage of water through the wash water outlet.

The said invention is hereinafter more particularly described with reference to the accompanying drawings which illustrate four embodiments of the said invention. In the following description the parts of the said drawings are referred to by the numerals marked thereon the same numerals indicating the same or equivalent parts in all the figures of the drawings.

Figures 1, 2 and 3 illustrate an embodiment of the said invention in a closed pressure filter having two downwardly acting beds as aforesaid Fig. 1 being a central vertical section Fig. 2 a horizontal section partly on the line A Fig. 1 and partly on the line B Fig. 1 and Fig. 3 a vertical section on the line C C Fig. 2 of the part of the filter through which the said line passes. Fig. 4 illustrates in vertical section an embodiment of the said invention in a closed pressure filter having two beds as aforesaid but in which the filtering action is upward through the bed of coarse filtering material. Figs. 5 and 6 illustrate in vertical section embodiments of the said invention in open gravity filters having only one bed of coarse filtering material.

Referring to Figs. 1, 2 and 3, 1 is the bed of coarse filtering material consisting of grit of such a degree or grade of coarseness (as for instance about ⅛ inc. to ¼ inc.) that it can be washed by downward flow of water through the bed and resting on layers 2, 3 of fine and coarse gravel respectively and supported by a perforated floor 4. 5 is the bed of fine filtering material consisting of fine sand mainly resting on layers 6, 7, 8, 9 of coarse sand grit fine gravel and coarse gravel respectively and supported by a floor 10 provided with tubular passages 11, 11 the upper ends of which are provided with shields 12, 12. 13 is the unfiltered water inlet. 14 is the filtered water outlet and 15 is the outlet or discharge for wash water. 16, 17 are rotatable perforated water conduits mounted over the beds 1, 5 respectively and carried by a hollow shaft 18 working in the inner part 19 of a double casing 20 secured to the floor 4 which part 19 communicates with the interior of the said shaft 18 by means of the perforations 21 therein and with a water conduit 22 which supplies water under a pressure of at least 15 lbs. per sq. inc. The outer part of the said casing 20 is divided by an inclined diaphragm 23 to form two passages 24, 25 the passage 24 communicating with the inlet 13 and the space above the bed 1 and the passage 25 communicating with the outlet 15 and the space between the beds. The means for rotating the water conduits 16, 17 consist of a crank handle 26 outside the filter secured to a shaft 27 working in a bracket 28 secured to the casing 20 and carrying a worm 29 gearing with a worm wheel 30 on the hollow shaft 18. The perforations in the rotatory conduits 16, 17 are fitted with nozzles those in the conduit 16 being ordinary spraying or spreading nozzles and those in the conduit 17 being ordinary jet nozzles. Around the passages 11, 11 in the floor 10 are concrete walls which form conical pits or inverted conically shaped open topped chambers 32, 32 containing the layers 6, 7, 8, 9 at the bottoms of which pits or chambers the passages 11, 11 are situated. The said layers support the fine bed 5, and thus perforated metal plates or grids are dispensed with. During filtration the water to be filtered enters through the conduit 13 and passes thence through the passage 24 to the space above the bed 1 whence it descends through the beds 1 and 5 successively and passes through the passages 11, 11 to the outlet 14. For washing and scouring the filtering material the inlet 13 is closed and the inlet 22 and the outlet 15 are opened. The water above the bed 1 then rapidly descends through it to the space beneath the floor 4 whence it passes upwardly by way of the passage 25 to the outlet 15 the confined air in the upper part of the filter preventing return of the water upwardly through the said bed 1. At the same time water is admitted to the filter through the filtered water outlet 14 which water passes upwardly through the passages 11, 11 and chambers 32, 32 and bed 5 and passes away from the space above the said bed with the wash water which has passed through the bed 1 the said chambers 32, 32 insuring even distribution of the wash water passing upwardly from the passages 11, 11. One passage opening into the space between the beds 1 and 5 thus serves for the outflow of the wash water from both beds. While wash water is thus passing through the beds 1 and 5 the conduits 16 and 17 are rotated and water issues in sprays and jets from them upon the filtering material which water passes away with the other wash water. The water of the sprays issuing from the conduit 16 cleanses or scours the surfaces of the particles of filtering material over which it passes and the water of the jets issuing from the conduit 17 impinges upon the surface of the bed of fine filtering material 5 burrowing into and agitating the material of the said bed and thus scouring the said material and aiding the passage and action of the wash water passing upwardly through the bed.

In the construction represented in Fig. 4 the casing 20 is a single tube communicating only with the inlet 22 and hollow shaft 18 and the space between the beds 1 and 5 is divided watertight by a partition 33. The water to be filtered after passing from the inlet 13 upwardly through the bed 1 passes through the pipe 34 which is provided with a valve 35 and through an inlet 36 to the space above the bed 5 through which it descends. In the washing operation the wash water after passing downwardly through the bed 1 passes from the filter by way of the inlet 13 and its branch 37 and the wash water passing upwardly through the bed 5 passes through the inlet 36 and its branch 38 the valve 35 being closed during the washing operation. At the same time the conduits 16, 17 are rotated and discharge scouring water as hereinbefore described.

The filters illustrated in Figs. 5 and 6 are serviceable for removing the bulk of the coarser suspended matter from water previous to its filtration through a fine filter or for use where coarse filtration only is required. The construction illustrated in Fig. 5 is for upward filtration and that illustrated in Fig. 6 is for downward filtration but in both constructions the beds are washed by downward flow of water therethrough. In both the said figures 39 is the unfiltered water inlet and 40 the filtered water outlet and 41 is the flush out or outlet for the wash water. A rotatable water discharge conduit 42 is mounted over the bed as hereinbefore described and provided with a hollow balancing arm 43. The said conduit 42 is in communication with the conduit 22 to supply water under about 3 lbs. per sq. inc. through a hollow stationary pedestal 44 forming a branch to the said conduit 22 and having a passage 45 in it opening into a casing 46 working on the said pedestal 44 and carrying the conduit 42 and the worm wheel 30. A dome or shield 47 having openings 48, 48 in its lower part is arranged over the wash water outlet 41 in order to provide for air controlled discharge of the wash water and a pipe 49 having a valve 50 communicates with the space in the upper part of the said shield 47. When the filter is in action the valve 50 is closed and the air confined in the upper part of the shield above the water in the trap of the outlet 41 prevents flow of water to it thus forming an air lock to discharge of wash water. When the filter bed is to be washed the inlet 39 and outlet 40 are closed and the valve 50 is opened allowing the air confined in the shield 47 to escape through the pipe 49 under the pressure of the water in the filter. The water above and in the bed then descends rapidly through it and passes through the outlet 41. At the same time water is sprayed from the conduit 42 which is rotated. By providing a comparatively large wash water outlet 41 controlled by an air lock as hereinbefore described the necessary sudden and rapid descent and discharge of the wash water is provided for in open filters of comparatively large area. In the filter illustrated in Fig. 5 the bed of coarse filtering material consists mainly of two layers 51, 52 the material of the upper one 51 of which is rather finer and that of the lower layer 52 rather coarser than the grade hereinbefore specified.

We claim:—

1. In a filter suitable for working waterlogged and provided with independent outlets for the wash water and the filtered water, the combination of a coarse filtering bed, means for causing downward passage of wash water therethrough, a traveling perforated water conduit arranged above said coarse bed, a fine filtering bed through which the water to be filtered passes after passing through the coarse bed, and means for causing upward passage of wash water through said fine bed.

2. In a filter suitable for working waterlogged and provided with independent outlets for the wash water and the filtered water, the combination of a coarse filtering bed, means for causing downward passage of wash water therethrough, a traveling perforated water conduit arranged above said coarse bed, a fine filtering bed through which the water to be filtered passes after passing through the coarse bed, means for causing upward passage of wash water through the fine bed, and a traveling perforated water conduit arranged above said fine bed.

3. In a filter suitable for working waterlogged and provided with independent outlets for the wash water and the filtered water, the combination of a coarse filtering bed, means for causing downward passage of wash water therethrough, a traveling perforated water conduit arranged above said coarse bed, a fine filtering bed spaced below the coarse bed and through which the water to be filtered passes after passing through said coarse bed, means for causing upward passage of wash water through said fine bed independently of the passage of wash water through the coarse bed, and a common discharge passage for the currents of wash water in communication with the space between said beds.

4. In a filter suitable for working waterlogged and provided with independent outlets for the wash water and the filtered water, the combination of a coarse filtering bed, means for causing downward passage of wash water therethrough, and a traveling perforated water conduit arranged above said coarse bed, a fine filtering bed through which the water to be filtered passes after passing through the coarse bed, means for causing upward passage of wash water through the said fine bed, and a floor for supporting said fine bed provided with outlets and with chambers of upwardly increasing sectional area around the same, said chambers containing coarse filtering material on which the fine filtering material rests.

FRANK CANDY.
FRANK PULLEN CANDY.

Witnesses:
WILLIAM THOMAS WHITEMAN,
PERCY CHARLES RUSHEN.

Copies of this patent may be obtained for five cents each, by addressing the "Commissioner of Patents, Washington, D. C."